INVENTORS
ERNEST G. NEWMAN
ROBERT J. SIPPEL
RAYMOND A. SKOV

BY Mitchell & Bechert

ATTORNEYS

United States Patent Office 3,103,000

Patented Sept. 3, 1963

3,103,000

SKEW CORRECTION SYSTEM

Ernest G. Newman, Robert J. Sippel, and Raymond A. Skov, Poughkeepsie, N.Y., assignors to International Business Machines Corporation, New York, N.Y., a corporation of New York Filed Apr. 1, 1960, Ser. No. 19,327

11 Claims. (Cl. 340—174.1)

This invention relates to a system for compensating for skew in information-carrying media and, more particularly, to techniques for maintaining stored digital information in proper time relationship during read-out.

It is common practice to store digital information in tracks of individual bits in a medium such as, for example, magnetic tapes, and in instances when a predetermined number of bits is to be read out simultaneously from parallel tracks to represent a single character of information, it is important that only such bits be read out and at the same time.

When magnetic tapes are used as the information carrying medium, it is not always possible to pass the tape continuously at a fixed desired angle relative to a transducer head. Due to such factors as wear on the tape guides causing "play" between the tape and the guides, or angular flutter in the tape itself, the tape direction changes from instant to instant. The angle between the actual tape direction and the desired direction is referred to hereinafter as "skew."

A principal object of the invention, therefore, is to provide a novel system to compensate for skew in an information carrying medium.

It is a further object of the invention to provide a system for reading out character bits sensed at different times, and adjusting the time position of the bits sensing outputs so that the outputs corresponding to the bits of a character may be read simultaneously.

Another object of the invention is to provide a system employing calculator techniques to compensate for skew in an information carrying medium which stores digital information in parallel tracks of individual bits.

In accordance with an aspect of the invention, there is provided a system for correcting skew of a storage medium containing a plurality of tracks for the storage of bits of information, a character of information being represented by the presence or absence of bits along a line transverse to the direction of the tracks. The system is characterized in that the storage medium comprises a synchronizing character consisting of bits in at least two of the tracks. A transducer is provided for each of the tracks, and the plurality of transducers are adapted to read the bits simultaneously in the absence of skew; in the presence of skew the bit in one track is read prior to the bit in the other track. The skew is compensated for by means of logical circuits, one for each track of the medium. The respective logical circuits comprise means for delaying the outputs from the respective transducers different amounts so that the outputs corresponding to the bits of the synchronizing character will appear simultaneously at the outputs of the respective logical circuits.

The above and further objects and advantages of the present invention will be understood more readily from the following detailed description of one preferred embodiment taken with the accompanying drawings, in which.

Figure 2:
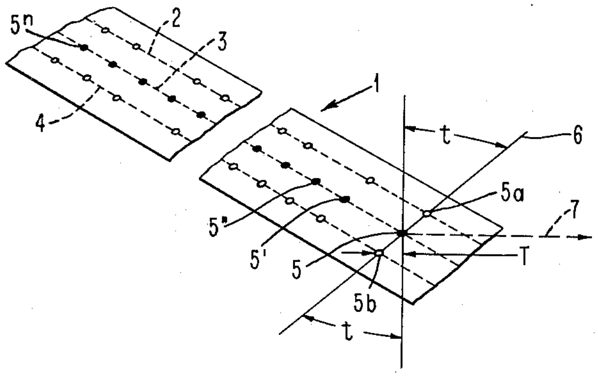
FIG. 2 is a simplified illustration of one information carrying medium illustrating an exaggerated skew.

Referring first to FIG. 2, a magnetic tape 1, shown by way of example, may comprise any practical number of information bit tracks, although three tracks 2, 3, and 4 are shown for the purposes of this description. The center track 3, illustrated by solid dots, contains regularly spaced synchronizing bits indicated by the numerals 5, 5', 5'' . . . **5*n***.

All of the bits stored in the tape 1 along a transverse line, such as line 6 in FIG. 2, represent one character of information. Therefore, it is essential that each bit in its respective track be read out simultaneously with the other bits along the same transverse line 6. However, in passing through the transducer heads, the tape may be skewed as illustrated by the angle *t* in FIG. 2, the arrow 7 being indicative of the desired direction of travel.

At the beginning of each tape a plurality of character synchronizing bits **5*a*, 5 and 5*b* are stored along the transverse line 6** to permit initial setting up of each individual electric circuit, to be described presently, there being one circuit for each track, so that energy for each information bit detected will be stored an appropriate length of time for reading out simultaneously with energy for bits sensed along the same transverse line by other track sensing circuits.

Figure 1:
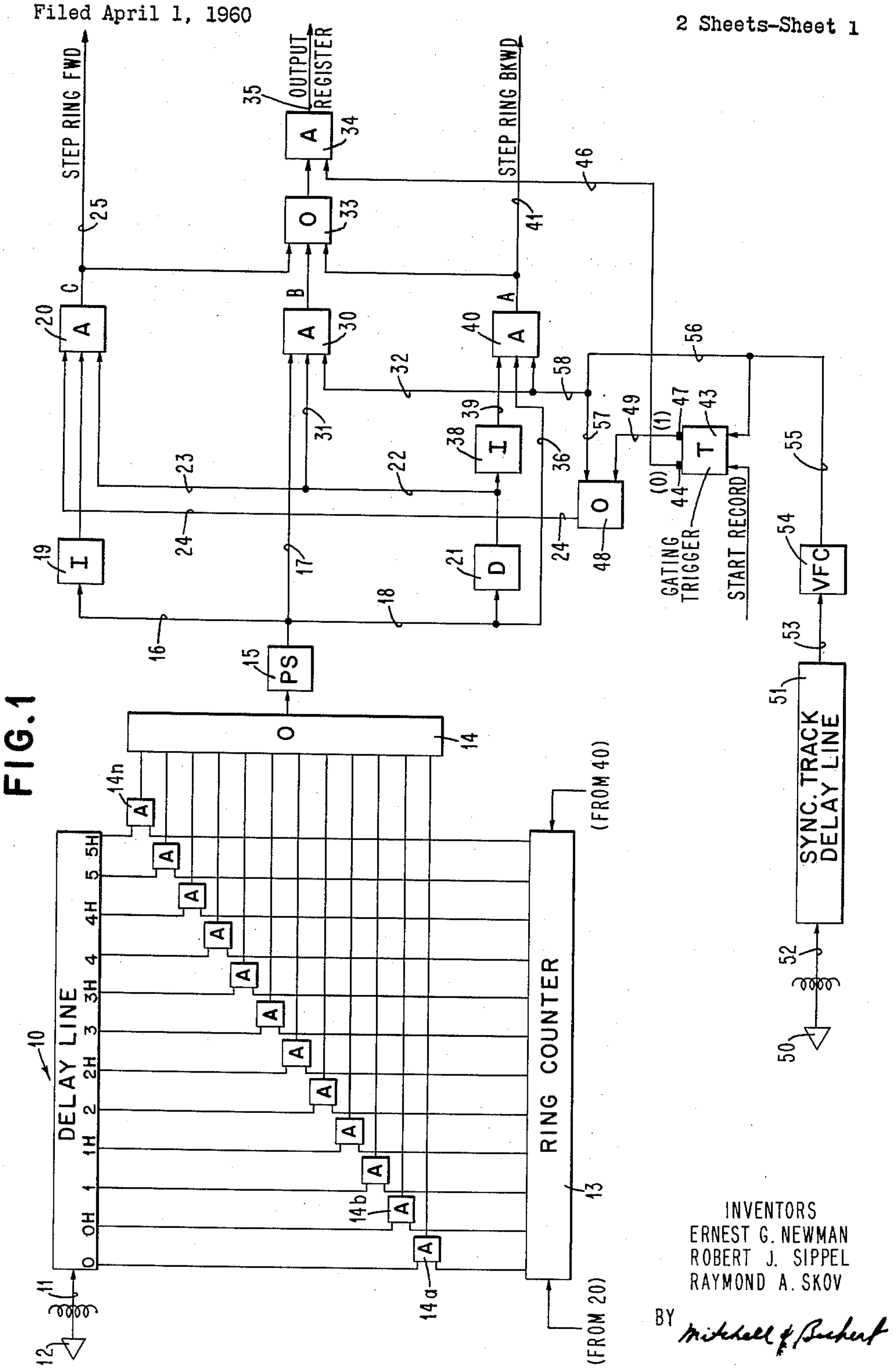
FIG. 1 is a block diagram illustrating a circuit arrangement for the invention.

A circuit such as shown in FIG. 1 is positioned to sense each track of information bits (but not including a synchronizing track which will be subsequently explained), the number of circuits corresponding to the number of tracks.

Referring now to FIG. 1, the circuit comprises a delay line 10, of conventional design, having an input terminal 11 at one end thereof. A transducer head 12 is adapted to detect signal bits stored on a magnetic tape along one track of a multi-track tape and apply the detected signals serially to the input terminal 11.

As each signal travels down the delay line 10 (during initial set-up of the system) the signal is read out successively at the taps identified by the letters "O," "OH," 1, 1H, etc. until a delay tap related to the degree of skew is reached. The delay line is capable of delaying the transducer produced pulses corresponding to the information bits for a period slightly greater than the time represented by the maximum skew, for reasons which will appear later.

The "O" terminal is the initial output tap representing no delay. As the pulse progresses along the delay line, it is delayed in time until it reaches the "OH" tap at which point the pulse has been delayed one-half period. At the "1" tap, the pulse has been delayed one period, at the "1H" tap the pulse has been delayed one and one-half periods, and so forth.

Each of the output taps is connected, respectively, to one terminal of a dual input logic AND gate circuit **14*a*, 14*b*, . . . 14*n*. The other input for each of these AND gate circuits is supplied by a conventional ring counter 13**.

The ring counter is initially set to deliver an output to the first AND gate **14*a*, whereby upon application of an output from the first delay tap "O" to the gate 14*a*, the gate delivers a pulse to OR circuit 14 which is coupled to the outputs of all the AND gates 14*a*, 14*b* . . . 14*n*. From the OR circuit 14, the pulse is delivered to a pulse shaper 15** which sharpens the pulse and delivers it to three parallel paths indicated by the numerals 16, 17 and 18, respectively.

In the electrical path 16, the pulse is inverted at 19 and applied to one terminal of a three-input logic AND circuit 20. The AND circuit 20 also receives a pulse from the path 18 after that pulse has been delayed a fixed amount by delay circuit 21 and applied through electrical conductors 22 and 23.

An electrical connection 24 applies a continuous input (the derivation of which will be explained later) to the AND circuit 20 to enable the circuit 20 at the appropriate time for transmitting an output pulse over an electrical connection 25 to the ring counter 13 to step the counter forward one step, and apply an output to AND gate 14*b*. The several delays introduced by the circuit after the pulse leaves the OR circuit 14 is less than the half-period delay imposed on the input pulse by the delay line 10. In this way the ring counter is timely operated and the next succeeding AND gate is primed for operation by the delayed pulse as it appears at the next tap.

Figure 3:
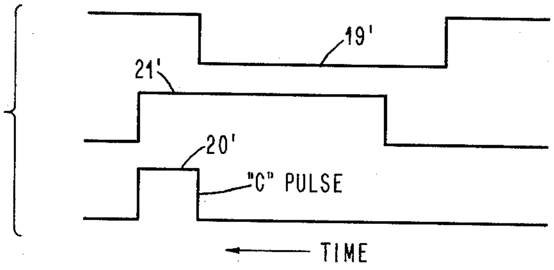
FIG. 3 is a plot of an inverted bit pulse being "anded" with a delayed bit pulse to develop a time lag pulse "C"

As illustrated in FIG. 3 of the drawings, a pulse delivered by the inverter 19 appears as pulse 19′, and a pulse delivered by the delay circuit 21 to connections 22 and 23 appears as pulse 21′. Assuming that the AND circuit 20 is prepared by the existence of a trigger pulse on lead 24, it delivers an output in response to a coincidence of pulses 19′ and 21′ through electrical connection 25. The output appears as pulse 20′ in FIG. 3. Since the inverter 19 merely inverts the pulse and since the amount of delay imposed by delay circuit 21 is fixed, the pulse 20′ is of fixed shape and magnitude, and delayed a fixed time. The pulse 20′ represents a "lagging" time pulse, and is a pulse which indicates that the corresponding bit is leading the other bits of the character.

Figure 4:
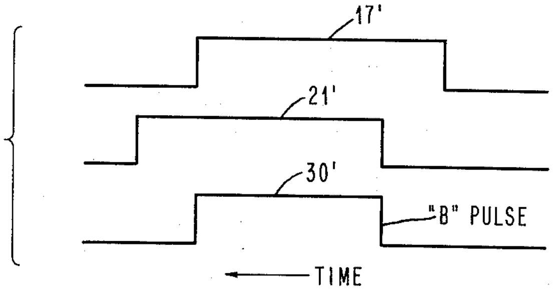
FIG. 4 is a plot of the bit pulse being "anded" with a delayed bit pulse to develop an on-time output pulse "B"

As stated previously, the pulse from the pulse shaper 15 is delivered also to the electrical conductor 17 and appears as shown by the pulse 17′ in FIG. 4. This pulse 17′ is delivered directly to a three-input logic AND circuit 30. Also applied to the AND circuit 30 is the delayed pulse 21′ from the delay circuit 21 through the conductor 22 and the conductor 31.

Assuming the AND circuit 30 has also been prepared by a trigger pulse over the conductor 32, to be described in detail presently, the AND circuit 30 then delivers a pulse 30′ to an OR circuit 33. The output from the OR circuit 33 is applied to an AND circuit 34; and assuming that the circuit 34 has been previously prepared, it delivers an output to terminal 35 representing an on-time pulse for read-out.

Figure 5:
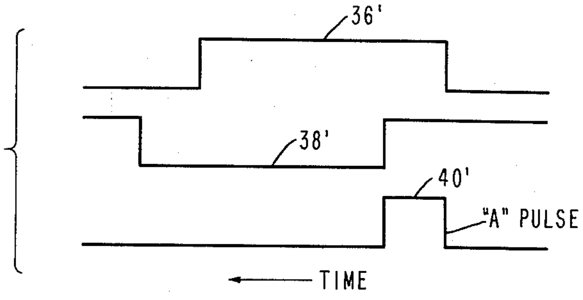
FIG. 5 is a plot of an information bit pulse being "anded" with an inverted and delayed bit pulse to develop a time lead pulse "A."

The pulse from the pulse shaper 15 is delivered also through conductor 18 and a conductor 36 to a third three-input logic AND circuit 40. The delayed pulse from the delay line 21 is inverted at 38 and applied also to the AND circuit 40. These pulses are shown in FIG. 5 of the drawings and identified by the numerals 36′ and 38′ respectively. The trigger pulse applied to the second AND circuit 30 is also applied to the AND circuit 40 through conductor 58, whereby the conditions for operation are satisfied and the circuit provides an output. The output pulse from the AND circuit 40 is identified by the numeral 40′ in FIG. 5, and it is this "leading" time pulse 40′ that is delivered through a conductor 41 directly to the ring counter 13 to step the ring counter 13 backward one step. In other words, the "A" pulse indicates that the corresponding bit is lagging other bits of the character and the time position of the bit must be advanced in time relative to the other bits.

As explained, each of the AND circuits 20, 30 and 40 is controlled by a trigger pulse. The AND circuit 20 is initially controlled by a gating trigger circuit 43 connected through its "1" terminal 47 to an OR circuit 48 through a conductor 49. The output from the OR circuit 48 is applied directly to the AND circuit 20 through the conductor 24. The gating trigger 43 is connected also through its "O" terminal 44 and conductor 46 to the AND circuit 34.

Thus, the AND circuit 20 will be conditioned by a continuous output delivered from terminal 47 until the output of the gating trigger 43 is switched to the "O" terminal 44 as will now be described.

Another transducer head 50 is positioned to detect synchronizing bits (in the center track 3, FIG. 2) and apply representative signals to one end of a synchronizing track delay line 51 at an input terminal identified by the numeral 52. The synchronizing track delay line 51 delays each synchronizing pulse an interval of time which is approximately equal to half of the maximum delay that can be produced by the delay line 10.

The requirement for such delay in the delay line 51 is to permit the most lagging pulses from respective tracks to have entered the associated delay lines 10, by the time the delayed synchronizing pulse is leaving the line 51.

The delayed pulse from line 51 is applied through a conductor 53 to a variable frequency clock 54, an example of which is disclosed in copending application Serial No. 745,731, filed June 30, 1958, in the name of E. G. Newman. The variable frequency clock 54, in turn, delivers regularly timed and spaced pulses to the following circuits: by means of a conductor 55 to the gating trigger 43, by means of conductors 56 and 57 to the OR circuit 48, and by means of the conductors 58 and 32 to the AND circuits 40 and 30, respectively.

Assume for illustrative purposes that a magnetic tape 1 is moving in a direction indicated by the arrow 7 (FIG. 2) and that the tape is at the particular skew position shown. The first character stored on the magnetic tape 1 is the synchronizing character and is made up exclusively of bits indicated by the numerals 5, 5*a*, and 5*b*. That is, corresponding transverse positions of all tracks are occupied by bits. This synchronizing character precedes the information characters by a distance which is greater than a displacement caused by the maximum skew.

It is essential, therefore, that the bit 5*a* be delayed an amount of time equal to 2*t* so that it may be read out simultaneously with the bit 5*b*.

At the start of the record, the gating trigger 43 is turned on, that is, its positive output is switched from the "O" terminal to the "1" terminal. The continuous output from trigger 43 is applied to the OR circuit 48 which is caused to deliver a corresponding output to the AND circuit 20.

As previously explained, the pulse shaper circuit 15 delivers a pulse to the AND circuit 20 over the connection 16, and a third pulse is applied to the AND circuit 20 from the delay circuit 21, through the conductors 22 and 23. Thus, the conditions for circuit operation are satisfied and AND circuit 20 produces an output pulse.

The lagging time output pulse 20′ from the AND circuit 20 is applied through conductor 25 to the ring counter to step the counter forward. The ring counter 13 will, therefore, be stepped forward one step to apply a pulse to the second gating circuit 14*b* connected with the second delay line tap "OH." When the delayed input pulse arrives at tap "OH," the second AND circuit 14*b* is rendered conducting, and the cycle is then repeated.

Thus, at the beginning of the record, and assuming a skew as shown in FIG. 2, the first bit sensed is 5*a*. The pulse produced by this bit is gated only by circuit 20, since the gates 30 and 40 are prepared by the pulse resulting from the synchronizing bit 5. Until the bit 5 is sensed, the "C" pulse is gated by circuit 20 and returned to step the ring counter forward. This cycle is repeated until the pulse corresponding to the bit 5 emerges from the delay line 51 and the number of times that the ring counter is stepped forward depends on the degree of skew. As explained, the delay of line 51 is approximately half the maximum skew; therefore, the pulse corresponding to the most lagging bit is also on its delay line, and the first pulse has been continuously and cyclically delayed so that it corresponds in time to the most lagging pulse.

The clock pulse is essentially a spike, and is applied respectively to the trigger circuit 43, the OR circuit 48, and the AND circuits 30 and 40.

The application of the clock pulse to the trigger 43 serves to switch the trigger to produce an output over its "O" terminal. The OR circuit 48, however, now receives the clock pulse at is other input, which enables the circuit to deliver a corresponding pulse to the AND circuit 20. Under proper operating conditions, the first clock pulse appears at a time coincident with the detection of the most lagging bit (with maximum skew), and at a time coincident with the overlapping portions of the pulses 17' and 21' to produce the pulse B. For this time position of the clock pulse, there will be no overlapping portions of the three pulses applied to either the AND circuits 20 or 40, and only the B pulses will appear at the output indicating that the most leading and lagging bits are appearing coincidentally at the outputs of their respective logical circuits.

If the leading bit pulse momentarily exceeds the initial skew, the clock pulse will overlap with the leading portions of pulses 36' and 38' in AND circuit 40 and pulse A will be produced. The output from the AND circuit 40 is applied to the ring-counter 13 to step it back one step.

Although the OR circuit 33 is coupled to an output from each of the AND circuits 20, 30 and 40 and produces an output in response to any one of the pulses "A," "B" or "C," the AND circuit 34 is coupled to the output of the OR circuit 33 and is not enabled until the emergence of the first clock pulse.

Thus, at the time that the leading bit pulse is delayed so that it is read simultaneously with the lagging bit pulse, all counters have selected one tap. The time difference between the selected tap of the leading track delay line and that of the lagging track represents the skew of the synchronizing character, and hence initial skew of the system. Incoming information then results in the leading track being delayed the most and the lagging track the least. In addition, the synchronizing bit initiates the generation of variable frequency clock controlled sample pulses. These pulses sample all output AND circuits for "A," "B" and "C" pulses; gate 20, through the OR circuit 48, and gates 30, 40 directly. If skew is unchanging, i.e. it remains the same as the synchronizing character, the sample pulse occurs coincidentally with the "B" time pulse and the information is read into the output register. If skew should change, e.g., the leading bit begins to lag its initial position, the sample pulse gates a portion of both the "A" and "B" time pulses, or depending on the amount of lag, the sample pulse may gate the A pulse only. That portion of the A time pulse fed back to the ring counter steps the counter backward until coincidence between the sample pulse and the B time pulse once again occurs. Similarly, if a lagging track should begin to lead its initial position, partial gating of the B and C time pulses (or only the C pulse) serves to step the particular counter forward.

The center synchronizing track 5 which preferably consists of synchronizing bits, but may also include data bits interspersed with synchronizing bits is written and read with each character and is used as the reference point to which all other bits of the corresponding character are timed. It is important, therefore, that the pulses representing the synchronizing bits occur regularly and at the predetermined frequency. In order to prevent inaccurate readings which might result from bit "drop-outs," a suitable clock such as the above-mentioned variable frequency clock is utilized to provide the pulses corresponding to synchronizing bits. Although the clock is preset, it is accurately synchronized by providing a series of synchronizing bits preceding the first synchronizing character.

Although we have referred to the tracks on either side of the synchronizing track as data tracks, it is to be understood that the data tracks could include synchronizing bits interspersed with the data bits.

While the invention has been described in considerable detail and a preferred form thereof illustrated, it is understood that various changes and modifications may be made therein without departing from the true spirit and scope of the invention as set forth in the following claims.

We claim:

1. A system for correcting skew of a moving storage medium containing a pair of spaced tracks and an intermediate track for the storage of bits of information, a character of information being represented by the presence or absence of bits along a line transverse to the direction of the tracks, said system comprising a synchronizing character consisting of bits in said tracks and positioned in a line transverse thereto, a transducer for each of the tracks, the plurality of transducers being adapted to read the bits simultaneously in the absence of skew, and in the presence of skew bit in one of said pair of tracks being read prior to the bit in the other of said pair of tracks, a logical circuit for each of said pair of tracks of said medium coupled to the transducer for each respective track, the respective logical circuits including delay means for delaying the outputs from the respective transducers different amounts so that the outputs corresponding to the bits of the synchronizing character will appear simultaneously at the outputs of said respective logical circuits, the delay means in each logical circuit being coupled to receive the output from the transducer with which it is associated, said logical circuits each further including separate coincidence circuits each having an input coupled to a different point along the delay means in the respective logical circuit, means in each logical circuit coupled to a second input of each of said coincidence circuits for supplying an enabling pulse to each such coincidence circuit at different times, and means for coupling said transducer of said intermediate track with each of said logical circuits.

2. The system according to claim 1, wherein said intermediate track is located symmetrically between said pair of tracks so that during skew the intermediate track bit is sensed at a time equal to one-half the period between the sensing of the outer track bits, said means for coupling said intermediate track transducer including a delay line coupled to the respective logical circuits and capable of producing a delay equal to said one-half period, means for applying the transducer output corresponding to said synchronizing bits to said delay line, whereby the delayed output corresponds in time to the lagging bit output, and said logical circuit delay means delaying the leading bit for a time equal to said period, whereby said bit outputs, after delay, appear simultaneously.

3. The system according to claim 2, wherein said logical circuit delay means comprises a delay circuit having a plurality of output taps representing increasing delays in uniform increments, the maximum delay exceeding the time of said period, the output from said transducers sensing the bits in the outer tracks being applied to the input of said delay circuit, and means responsive to the output from said delay circuit for selecting the tap corresponding to said period.

4. The system according to claim 3, wherein each of said coincident circuits has one input connected to a delay tap respectively, said means for supplying an enabling pulse comprising a sequential stepping device having an output for each level of operation connected to said coincident circuits respectively, each coincident circuit being operative in response to application of simultaneous inputs from said delay tap and said stepping device, and means responsive to the operation of a coincident circuit for driving said stepping device from one level of operation to the next, until the desired tap is selected.

5. The system according to claim 4, wherein said coincident circuits comprise two-input logic AND circuits.

6. The system according to claim 5, wherein said sequential stepping device comprises a ring-counter.

7. The system according to claim 6, wherein each of said logical circuits comprises first, second and third branches coupled to the respective outputs of said AND circuits, and each of said branches including means for developing, respectively, a first output adapted to drive said ring-counter forward in increments of one step, a second output indicating that the leading bit output has been delayed one period and is therefore coincident with the lagging bit output, and a third output adapted to drive said ring-counter backward in increments of one step.

8. The system according to claim 7, wherein said first branch comprises a first three-input AND gate, trigger means operative in response to the movement of said storage medium for producing a first continuous input to said AND gate, means for inverting the output from the operating AND circuit and applying it to a second input of said AND gate, and means for delaying the output from said operating AND circuit and applying it to the third input of said AND gate, said AND circuit output being in the form of a pulse, whereby the overlapping portions of said delayed and inverted pulses capable of operating said AND gate occur after the termination of said inverted pulse, and circuit means for applying the resultant pulse indicating a leading bit condition to said ring-counter for driving said ring-counter forward one step, whereby the next succeeding AND circuit is rendered operative, and the cycle is repeated.

9. The system according to claim 8, wherein said second branch comprises a second three-input AND gate, means for applying the pulse output from said operating AND circuit directly to a first input of said second AND gate, means for applying said delayed AND circuit pulse output to a second input of said AND gate, whereby a portion of the directly applied and delayed pulses overlap, and said delay line including means for producing a pulse of slightly less duration than the overlapped portion of said directly applied and delayed pulses, means for applying said delay line pulse to said trigger means for terminating the output thereof to said first AND gate, and means for applying said delay line pulse to the first input of said first AND gate and to the third input of said second AND gate, whereby when the delay of said delay line is equal to one-half period, the inputs to said first AND gate contain no overlapped portion, and said delay line pulse is coincident with said overlapped portions of the pulses applied to said second AND gate, whereby only the second AND gate delivers an output indicating that the leading pulse has been delayed a time equal to said period and is coincident with the lagging pulse.

10. The system according to claim 9, wherein said third branch comprises a third three-input AND gate, means for applying said AND circuit pulse output to a first input of said third AND gate, means for inverting said delayed AND circuit pulse and applying it to a second input of said third AND gate, and said delay line pulse being applied to the third input of said AND gate, whereby when the leading bit pulse exceeds said period, said delayed line pulse overlaps a poortion of said delayed-inverted pulse and said directly applied pulse, and means for applying the resultant pulse to said ring-counter for stepping the ring-counter back one step.

11. The system according to claim 10, and further comprising a variable frequency clock generator coupled to the output of said delay line, said clock being synchronized with the repetition rate of said synchronizing bits and producing pulses of predetermined width, whereby in the absence of a bit said clock continues to supply pulses to said second and third AND gates.

References Cited in the file of this patent

UNITED STATES PATENTS

| | | |
|---|---|---|
| 2,813,259 | Burkhart | Nov. 12, 1957 |
| 2,828,478 | Johnson | Mar. 25, 1958 |
| 2,842,756 | Johnson | July 8, 1958 |
| 2,907,989 | Guerber | Oct. 6, 1959 |
| 2,937,239 | Garber et al. | May 17, 1960 |
| 2,977,578 | Daniels et al. | Mar. 28, 1961 |

OTHER REFERENCES

RCA publication: "Tape Skew Corrector," by J. R. Hall, RCA TN No. 203, Sheets 1 and 2, received by Patent Office Jan. 5, 1959.